United States Patent [19]
Ladd

[11] Patent Number: 5,325,422
[45] Date of Patent: Jun. 28, 1994

[54] PBX TELEPHONE CALL CONTROL SYSTEM

[75] Inventor: David J. Ladd, Saratoga, Calif.

[73] Assignee: VMX, Inc., San Jose, Calif.

[21] Appl. No.: 150,591

[22] Filed: Nov. 10, 1993

Related U.S. Application Data

[63] Continuation of Ser. No. 200,705, May 31, 1988, abandoned, which is a continuation of Ser. No. 803,126, Nov. 29, 1985, Pat. No. 4,783,796.

[51] Int. Cl.$^5$ .................. H04M 3/50; H04M 3/58
[52] U.S. Cl. ........................ 379/67; 379/212; 379/214
[58] Field of Search .................. 379/67, 84, 88, 89, 379/210, 211, 212, 213, 214

[56] References Cited

U.S. PATENT DOCUMENTS

| | | | |
|---|---|---|---|
| 3,111,561 | 11/1963 | Dunning | 379/82 |
| 3,179,750 | 4/1965 | Reilly | 379/234 |
| 3,347,988 | 10/1967 | Marill et al. | 379/93 |
| 3,482,057 | 12/1969 | Abbott et al. | 379/67 |
| 3,510,598 | 5/1970 | Ballin et al. | 379/74 |
| 3,614,328 | 10/1971 | McNaughton et al. | 379/54 X |
| 3,793,487 | 2/1974 | Kilby | 379/74 |
| 3,859,473 | 1/1975 | Brown et al. | 379/225 |
| 3,867,582 | 2/1975 | Weed et al. | 379/198 |
| 3,963,875 | 6/1976 | Gueldenpfennig | 379/208 |
| 3,985,971 | 10/1976 | Colpoys | 379/215 |
| 3,989,901 | 11/1976 | Neuwirth et al. | 379/74 |
| 3,992,587 | 11/1976 | Puckett et al. | 379/96 |
| 4,086,438 | 4/1978 | Kahn et al. | 379/158 |
| 4,088,838 | 5/1978 | Nakata et al. | 379/89 |
| 4,122,308 | 10/1978 | Weinberger et al. | 379/131 |
| 4,139,739 | 2/1979 | von Meister et al. | 379/207 |
| 4,152,547 | 5/1979 | Theis | 379/70 |
| 4,191,855 | 3/1980 | Sakai | 379/102 |
| 4,200,772 | 4/1980 | Vicari et al. | 379/214 |
| 4,232,199 | 11/1980 | Boatwright et al. | 379/197 |
| 4,255,618 | 3/1981 | Danner et al. | 379/88 |
| 4,327,251 | 4/1982 | Fomenko et al. | 379/76 X |
| 4,356,351 | 10/1982 | Shefler et al. | 379/88 |
| 4,371,752 | 2/1983 | Matthews et al. | 379/89 |
| 4,376,875 | 3/1983 | Beirne | 379/88 |
| 4,413,158 | 11/1983 | Danford | 379/211 |
| 4,420,656 | 12/1983 | Freeman | 379/73 |
| 4,439,635 | 3/1984 | Theis et al. | 379/87 |
| 4,446,553 | 5/1984 | Webber | 379/201 X |
| 4,484,031 | 11/1984 | Gray et al. | 379/212 |
| 4,488,005 | 12/1984 | Frantz | 379/88 |
| 4,577,062 | 3/1986 | Hilleary et al. | 379/88 |
| 4,600,814 | 7/1986 | Cunniff et al. | 379/94 |
| 4,608,640 | 8/1986 | Carter et al. | 379/71 |
| 4,696,028 | 9/1987 | Morganstein et al. | 379/88 |
| 4,975,941 | 12/1990 | Morganstein et al. | 379/88 |

FOREIGN PATENT DOCUMENTS

| | | |
|---|---|---|
| 49-92908 | 9/1974 | Japan . |
| 0090663 | 7/1981 | Japan ................... 379/84 |
| 56-90664 | 7/1981 | Japan . |
| 0129469 | 10/1981 | Japan ................... 379/88 |
| 0054492 | 3/1982 | Japan ................... 379/211 |
| 58-187056 | 11/1983 | Japan . |

OTHER PUBLICATIONS

"ROLMphone User Guide," pp. 2–4, 17, 24, 83, and 86 (Rolm, Jul. 1985).
L. Goeller, Jr. & J. Goldstone, "The ABCs of the PBX," Datamation, pp. 9–13 (Apr. 1983).
T. Kopec & P. Lind, "Electronic Business Telephone," GTE Automatic Electric Journal pp. 34–40 (Mar. 1980).

(List continued on next page.)

Primary Examiner—Thomas W. Brown
Attorney, Agent, or Firm—Honigman Miller Schwartz and Cohn

[57] ABSTRACT

A PBX telephone call control system is disclosed. The system provides a line interface unit connection between a plurality of subscriber line extensions and a private branch exchange (PBX) switching equipment. The call control system appears to the PBX like any other telephone extension within the office environment and provides the user with more features in conjunction with the pre-existing PBX equipment, providing expanded capabilities at a reasonable expense.

1 Claim, 2 Drawing Sheets

OTHER PUBLICATIONS

K. Tapper & P. Thatte, "GTD-1000 Digital PABX CAS Main/ACD," GTE Automatic Electric Journal, pp. 182–193 (Nov. 1980).
Data Communications, pp. 158 and 160 (Jul. 1983).
R. Kaloian, "What if you cut over a new telecom system . . . and nobody used it?" Communication Age, pp. 46–47 and 50 (Sep. 1986).
R. Zarlenga, "Business Telephones With Enhanced Features: The Old Phone Gets Smart," Telephony v. 199 n. 2 pp. 78–79 (Jul. 14, 1980) (abstract).
Telephone Engineer and Management, p. 67 (Mar. 15, 1979).
Telesis (AT&T), p. 32 (1982 one).
M. Weik, "Communications Standard Dictionary," pp. 238 and 364 (Van Nostrand Reinhold Co. 1983).
The Teleconnect Dictionary, p. 177. (undated).
G. Langley, Telephony's Dictionary, p. 128 (2d.ed.), 1986.
T. Smith, "Abc of the Telephone," p. 20, BNR Inc. (undated).
IEEE Standard Dictionary of Electrical and Electronics Terms, pp. 245 and 357 (3rd. ed. 1984).
"Unanswered Call Diverter," IBM Technical Disclosure Bulletin, vol. 25, No. 7A, Dec. 1982, pp. 3480–3481.
"Applications of MT8860 Family of DTMF Receivers," Mitel Application Note (Aug. 1980).
"LPC-10 Speech Synthesizer With On-Chip 20k Speech Data ROM," S3610, AMI (Aug. 1982).
"S2559 DTMF Tone Generator," AN-101, AMI (Aug. 1982).
"A Unique Monolithic AGC/Squelch Amplifier," AN-51, NS (Sep. 1971).
"LF11508/LF13508 8-Channel Analog Multiplexer et al.," National Semiconductor (marked Jan. 1982).
"Telephone Coupling Transformers," Litton Triad-Utrad Distributor Services, Form TCT-74 (undated).
"Sine Wave Oscillator," AN20-9 (undated).
"AC/DC to Logic Interface Optocoupler," HCPL-3700, Hewlett Packard (Feb. 1982).
"Tone Decoder/Phase Locked Loop," Signetics (marked 1976).
"TP3040/TP3040A PCM Monolithic Filter," National Semiconductor (marked 1982).
J. Peatman, "I/O Control" (Chap. 5-1), I/O Timing (Chap. 5-2), Real-Time Programming (Chap. 7-2), Microcomputer-Based Design (McGraw Hill, 1977).
"Centrex-A Management Overview," Datapro Research Corp. (Nov. 1983).
M. Hills & S. Kano, "Programming Electronic Switching Systems-Real-Time Aspects and Their Language Implications," Section 2.4.2, Scheduling Functions Divided Systems, pp. 37–39, IEEE Telecommunications Series (Peter Peregrinus Ltd. 1976).
E. Smith, "Glossary of Communications," p. 64 (Telephony Publishing Corp. 1971).
"Rohm Centralized Attendant Service," Rolm Corp (1979).
"AIS Automatic Intercept Service Versatile Efficient Information Service," Fujitsu Limited (date stamped 1972).
"Data Set 407 Interface Specification," AT & T (Jun. 1975).
"Direct Inward Dialer", Telephonic Equipment Corp., p. D022956 (1981).
"Direct Inward System Access":, Telephonic Equipment Corp., pp. D022965-22966(1981).

FIG.—1

PBX TELEPHONE CALL CONTROL SYSTEM

This is a continuation of application Ser. No. 07/200,705, filed May 31, 1988, abandoned which is a continuation of application Ser. No. 803,126, filed Nov. 29, 1985, Pat. No. 4,783,796.

BACKGROUND OF THE INVENTION

The present invention relates to PBX (private branch exchange) interface equipment.

A PBX can be defined as a telephone exchange serving a single organization, having a switchboard and associated equipment, usually located on the customer's premises. The PBX equipment provides for switching calls between any two extensions served by the exchange or between any extension and the national telephone system via a trunk or trunks to a central office. PBX equipment is, of course, well known in the prior art, as numerous manufacturers are providing many types of PBX equipment for virtually every type of business environment.

Typically, the PBX equipment provides connections between a plurality of telephone subscriber lines (extensions) such as those located in a typical office environment and a plurality of trunk lines, typically smaller in number than the subscriber lines. The PBX equipment provides switching functions which permit subscribers, under certain limitations, in an office environment to gain access as required to trunk lines, including WATS (wide area telephone service), DDD (direct distance dialing) and the like, for enabling connections of telephone calls.

As a user's business expands, it frequently becomes desirable to add more features to pre-existing PBX equipment, and to provide expanded capabilities at a reasonable expense. However, a problem in the prior art is that, in order for an installation to provide additional features for the installed PBX equipment, it has been difficult to upgrade the existing PBX equipment because of limitations of space, memory storage, power limitations and the like.

In addition, the general approach with upgrading existing PBX equipment is by connecting additional switching equipment between the existing PBX and the trunks themselves. A further problem with such an approach is excessive costs which necessarily are involved with installations of more expensive switching equipment to the trunk lines.

It would therefore be desirable to provide a system for providing additional capabilities to existing PBX equipment in an office environment while not excessively increasing the cost of such upgrading of the existing equipment.

In view of the above background, it is an objective of the present invention to provide an improved interface equipment for connection to existing PBX equipment.

SUMMARY OF THE INVENTION

The present invention relates to a PBX telephone call control system for use with PBX type switching equipment.

In one embodiment, the call control system includes a plurality of trunk lines, a plurality of telephone subscriber lines or extensions (such as would be in a typical office environment) and PBX (private branch exchange) switching apparatus connected between the subscriber lines and the trunk lines.

The call control system also includes line interface equipment connected to the subscriber lines and consequently to the PBX equipment. The line interface unit simulates another extension within the system to the PBX equipment.

Hence, in a typical operation, the call control system appears to the PBX just like any other telephone extension within the system. In one mode of operation, the system is "called" by a user wishing to use its services, and when the system (and more particularly the line interface unit) detects a ring voltage, it in turn gives an off-hook tone to "answer" the call and returns a dial tone.

The user hears the dial tone and dials the number he wishes. The call control system analyzes the number, requests an authorization code if necessary, selects the most economical route, and "flashes" the PBX to indicate that a desired call is in process, dials (using a dual tone multifrequency signaling circuit) the trunk access code and the called number, and finally hangs up to complete the transfer of the user to the appropriate trunk.

Among the features provided by the present invention to the user in a PBX environment are:
 route optimization, which provides automatic selection of the least cost route for outgoing calls,
 call queuing, which provides that, when a least cost route is not available, automatic callback to a user when the route does in fact become available,
 toll restriction, which prevents unauthorized calls by requiring the user to enter an authorization code before a call will be placed, and
 station message detail recording, which provides information on what number were called.

Another feature of the present invention is a "talker" circuit, which provides pre-stored voice messages to automatically indicate to a user whether the most economical route is available or, if not, what other routes are available thereby providing the user with the capability of either completing his call or waiting until a more economical trunk is available.

In accordance with the foregoing summary, the present invention achieves the objective of providing an improved PBX telephone call control system for use in a PBX environment.

Other objects and features of the present invention will become apparent from the following detailed description when taken in conjunction with the accompanying drawings.

DETAILED DESCRIPTION OF THE DRAWINGS

Figure 1:
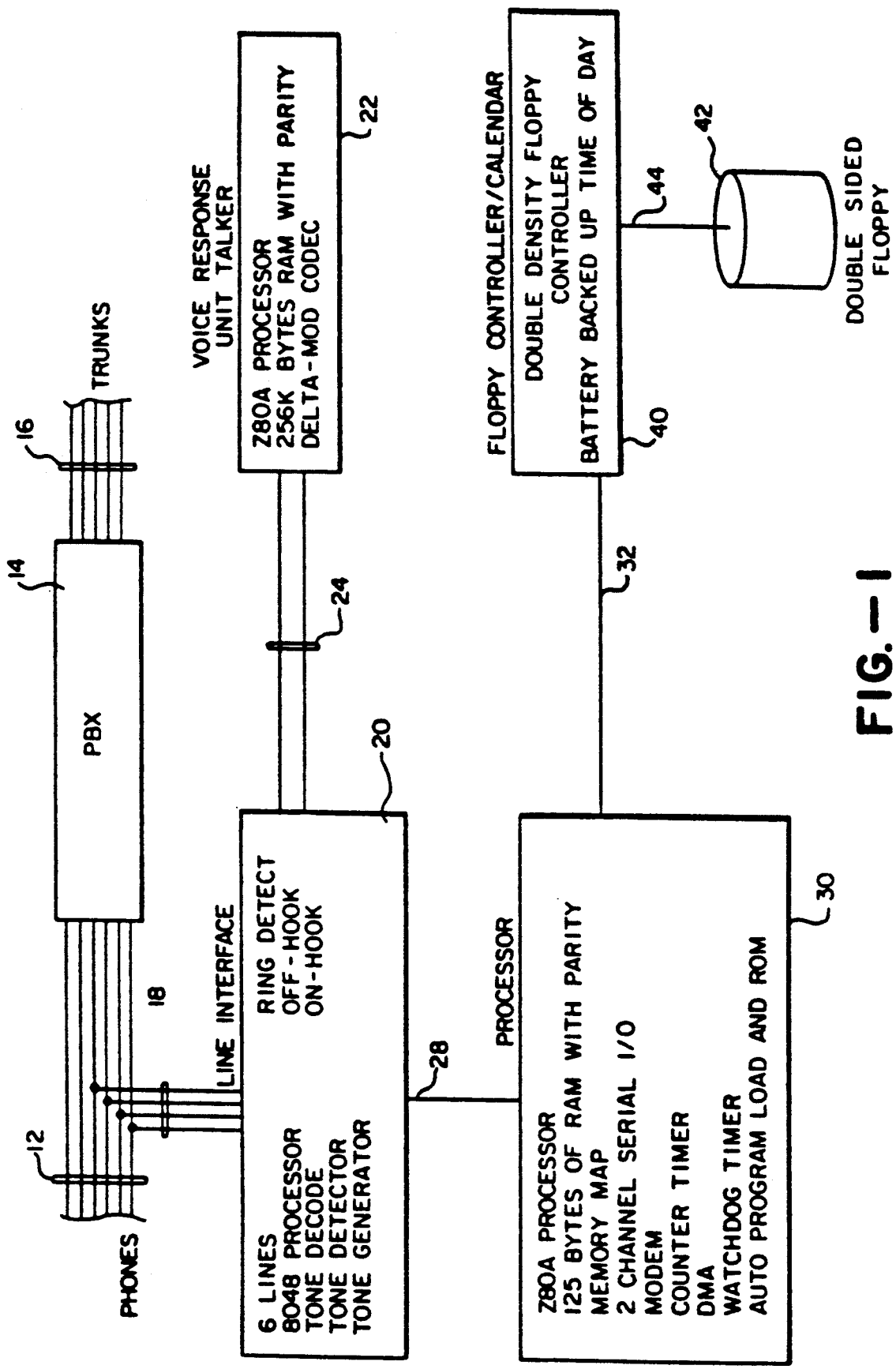
FIG. 1 depicts a block diagram of a PBX telephone call control system according to the present invention.

FIG. 1 depicts a block diagram illustrating the PBX telephone call control system as connected to the PBX (private branch exchange) interface. Before going into more detail concerning the drawings, a general system specification of one embodiment of the present invention will be described in some detail.

In operation, a user dials an access code for the system. Usually the access code will be the pilot number of a "hunt" group (an extension which, when dialed, will in turn cause to ring the first non-busy extension in a group of extensions). The user may hear a brief period of ringback tone before the system answers. When the system answers, the user will be given system dial tone.

The user then "dials" the feature desired. DIALTONE is removed after the first digit.

By looking at the digits dialed and its data bases, the system will then collect the necessary number of digits to complete the feature. In some special cases, such as international dialing, the system does not know how many digits to collect, and will wait until the user does not enter any more digits for an "interdigit timeout" (usually configured to be five seconds).

If the user dialed an illegal sequence of digits, the system will respond with the message "INVALID NUMBER, DIAL NUMBER" and the user will be given initial system DIALTONE.

If the user dialed any digit 0-9, the system enters the destination or external call function. If the system times out while waiting for the first destination digit, the system will respond with the message "ENTER NUMBER". If the user still does not respond before another timeout, the system will respond with the message "DIALED TOO SLOW" and then disconnect from the user. If the user starts entering his destination number and times out between digits, the system (with the following exception) will respond with the message "DIALED TOO SLOW" and then disconnect from the user. The exception is when the user has dialed an international number (starting with 01), a timeout will signal the system that all necessary digits have been entered. This is required because there is not a fixed length numbering plan for international dialing.

The digits *NNN (N is a digit 0-9) is the system speednumber feature. The number of N's is configurable from 1 to 3 depending on the number of speednumbers configured for the system.

Toll restriction is used to prevent certain people from dialing expensive calls. It is also used to allow people to dial certain numbers without identifying themselves.

If certain numbers are desired to be dialed by anyone and no identification of the caller is desired, these numbers should be listed in the "Exempt" table. These calls will be exempt from having the user be asked for his account code. The system default Class of Service (COS) will be used for these calls. Exempt numbers may be three or six digits long. They are area codes, area code + office codes, or office codes. If complete seven or ten digit numbers are to be exempt, the speednumber feature should be used for these numbers. If a specific office code for any area code, such as 555, is to be exempt, a special flag may be used preceding the 555 to flag a match on any area code.

If certain numbers are to be blocked from being dialed by everyone, these numbers should be listed in the "Blocked" table. Typical numbers may include, for example, Time. Blocked numbers can be up to ten digits long. If the number dialed is "blocked" the system responds with the message "RESTRICTED NUMBER DIALED" and then disconnects from the user.

If the number dialed was not Exempt or Blocked or a speed-number from which a COS could be found, the user will be asked to enter an Account code.

Account codes are used to determine the COS and extension number of the user. If the number dialed requires an account code to be entered, the system will respond with the message "ENTER ACCOUNT CODE". The user then enters the account code. If it is invalid, the system will respond with the message "INVALID ACCOUNT CODE, ENTER ACCOUNT CODE". The user is allowed three tries, after which the system will respond with the message "INVALID ACCOUNT CODE" and then disconnect from the user.

Route Optimization is used for both selecting the best route to use to place the call, and to provide toll restriction based on the COS of the user. Time of day or day of week changes are applied to the user's COS prior to continuing with route optimization.

If the call is a 0 or 0+digits call, the system parameter table is checked to see if the user has the minimum COS necessary to place this type of call. If so, the call is routed over the system default route, which is DDD. If the user does not have a high enough COS, the system will respond with the message "RESTRICTED NUMBER DIALED" and then disconnect from the user.

The system then searches the routing tables for the number dialed. When it finds a match, it then has a list of choices for route to use for that specific call. If no match is found, the system default list (which is DDD only) is used. A route describes a specific trunk group and information about the digits (strip Area Code...) to be outpulsed.

If the first choice route cannot be used due to COS restrictions, the system will "Route and Advance" to the next choice route. If the COS of the user does not allow access to any route on the list, the system will respond with the message "RESTRICTED NUMBER DIALED" and then disconnect from the user. This is the usual method of toll restriction.

The system starts with the first choice route. If the user COS allows him access, and the route is known to be idle, the system flashes, dials the trunk access code, waits for external dial tone, outpulses the destination digits, and completes the transfer by hanging up.

If the first choice route cannot be used because it is busy, the system checks COS information to see if the user is required to queue on this route before advancing to the next route. If not, the next route is tried as described above. This continues all the way down the list of routes until an idle trunk is found.

Whenever the system is about to try the DDD route and there were cheaper but busy routes which the user could queue for but his high COS caused him not to be asked to wait, the system will respond with the message "CALL IS BEING PLACED ON AN EXPENSIVE ROUTE, PRESS STAR TO PROCEED, ENTER EXTENSION NUMBER TO CALLBACK QUEUE". There is a flag by COS telling if this question should be asked. If the user keys a #, the call is cancelled and the user is dropped to system dialtone.

If the user because of COS can use a route, his COS also allows him to callback queue for the route. A different flag by COS tells if the user can offhook queue for the route. If the user is required to queue for the first choice route, his COS is also checked to see if he can offhook queue for this route. If he can offhook queue, the system responds with the message "ALL ROUTES BUSY, XX CURRENTLY WAITING, PRESS STAR FOR OFFHOOK QUEUE, ENTER EXTENSION NUMBER FOR CALLBACK QUEUE". If he is not allowed to offhook queue, the system responds with the message, "ALL ROUTES BUSY, XX CURRENTLY WAITING, ENTER EXTENSION NUMBER FOR CALLBACK QUEUE". XX is the smallest number of people waiting for any of the routes he could queue on.

After the user enters his extension number, the system gives no confirmation, but just disconnects from the user. If the user enters a star, he goes into an offhook queue state, but also gets no confirmation. While a user is offhook queued, he will normally hear silence, and sometime "clicks" when he is put on hold to try for the trunk. If the user does nothing for a "first digit timeout" period (usually ten seconds), the system will assume he is not interested in queuing and will give the timeout message "PLEASE DIAL" with another three seconds, and if no response, disconnects from the user. Entering a "#" prior to system disconnect will cause the system to drop the user back to system DIAL-TONE. While waiting offhook, if the call is placed on a cheap route, no message is given to the user.

There is also a configurable limit to the number of ports to be used for offhook trunk queuing. If this limit is reached, the user will be asked if he wishes to callback (onhook) queue only.

Whenever the system is about to try the DDD route and there were cheaper but busy routes which the user could queue for but his high COS caused him not to be asked to wait, the system will respond with the message "CALL IS BEING PLACED ON AN EXPENSIVE ROUTE. PRESS STAR TO PROCEED, ENTER EXTENSION NUMBER TO CALLBACK QUEUE". There is a flag by COS telling if this question should be asked. Asking this question to an offhook queued person will force him to go to onhook queue if he wants to continue to wait. If he chooses to wait onhook for the cheap route, he will wait there with no timeout until one of the cheaper routes becomes available.

When a trunk becomes available for a queued call, or the user is route advanced to a route which has an available trunk, the system will call back the user at the extension number he has entered.

If the user does not answer, after ten minutes the system will try to call the user again when the trunk queued for is free. This retry is done only once, after which the queue is cancelled.

If the user presses *, the call is placed. If the user presses #, he requeues and will not be called back for ten minutes. This is used if he is occupied. If the user does nothing, or hangs up, the queue is cancelled and the system disconnects from the user.

If the call is going out over DDD, the system responds with the message "CALL TO XXX XXX XXXX IS BEING PLACED ON AN EXPENSIVE ROUTE, PRESS STAR TO PROCEED, PRESS POUND TO WAIT FOR A LOW COST ROUTE".

If the user presses in a *, the call is made. If the user presses in a #, the call is requeued on the more expensive routes with no timeout. Thus the system will wait forever, or until a cheap route becomes available.

Illustrative examples of the types of talker messages which can be generated are set forth below:

1. DIAL NUMBER
2. INVALID NUMBER, DIAL NUMBER
3. INVALID FUNCTION
4. INVALID SPEEDNUMBER, DIAL SPEEDNUMBER
5. ENTER ACCOUNT CODE
6. INVALID ACCOUNT CODE, ENTER ACCOUNT CODE
7. INVALID ACCOUNT CODE
8. RESTRICTED NUMBER DIALED
9. ALL ROUTES BUSY
10. ALL ROUTES BUSY, XX CURRENTLY WAITING, PRESS STAR FOR OFFHOOK QUEUE, ENTER EXTENSION NUMBER FOR CALLBACK QUEUE
11. ALL ROUTES BUSY, XX CURRENTLY WAITING, ENTER EXTENSION NUMBER FOR CALLBACK QUEUE
12. CALL IS BEING PLACED ON AN EXPENSIVE ROUTE, PRESS STAR TO PROCEED, ENTER EXTENSION NUMBER FOR CALLBACK QUEUE
13. CALL IS BEING PLACED ON MCI, PRESS POUND TO BYPASS
14. CALL IS BEING PLACED ON SPRINT, PRESS POUND TO BYPASS
15. CALL TO XXX XXX XXXX CAN BE PLACED, PRESS STAR TO PROCEED, PRESS POUND TO REQUEUE
16. CALL TO XXX XXX XXXX IS BEING PLACED ON MCI, PRESS STAR TO PROCEED, PRESS POUND TO BYPASS
17. CALL TO XXX XXX XXXX IS BEING PLACED ON SPRINT, PRESS STAR TO PROCEED, PRESS POUND TO BYPASS
18. CALL TO XXX XXX XXXX IS BEING PLACED ON AN EXPENSIVE ROUTE, PRESS STAR TO PROCEED, PRESS POUND TO WAIT FOR A LOW COST ROUTE
19. DIALED TOO SLOW
20. ALL ROUTES BUSY, XX CURRENTLY WAITING, PRESS STAR FOR OFFHOOK QUEUE
21. CALL IS BEING PLACED ON AN EXPENSIVE ROUTE, PRESS STAR TO PROCEED

Now that a general overview has been described, a specified example of the system's operation will be given in conjunction with a typical telephone call placed by a user. The specific example will be described with reference to FIGS. 1 and 2.

Referring now to FIG. 1, PBX 14 is connected to a plurality of trunk lines 16 and, in addition, to a plurality of conventional subscriber lines (or extensions) 12.

As previously described, PBS 14 provides for switching calls between any two extensions served by the exchange or between any extensions in the national telephone system via a trunk or trunks 16 to a central office (not shown). PBX 14 could be of any type well known in the art.

Subscriber lines 12 are connected to PBX 14 in the normal fashion. In addition, the system depicted in FIG. 1 shows a line interface unit 20 connected to subscriber lines 12 via bus 18. In a preferred embodiment, six lines are connected from line interface unit 20 to subscriber lines 12 via bus 18.

Line interface unit 20 is depicted in more detail in FIG. 2 and will be described in some detail below.

Referring again to FIG. 1, line interface unit 20 is connected to a talker circuit 22 via bus 24. Talker circuit 22 includes a Z80A microprocessor and includes up to 256K bytes of random access memory (RAM), with parity, and in addition a delta-mod codec. Talker circuit 22, as has been described above, provides a user with verbal instructions regarding whether a particular desired trunk or extension is available, and, in the alternative, if cheaper and/or more expensive routes are the only means available.

Such a talker circuit option provides, therefore, a user with specific instructions which are easily understood regarding gaining access to a desired economical trunk line, such as WATS or other more economical trunk. Talker circuit 22 will provide specific instructions to the user who is requesting access to a specified trunk such as a WATS and will advise the user request with other options available.

FIG. 1 also includes a main processor 30, which provides the system with general supervision of line interface unit 20. Processor 30 typically includes a Z80A microprocessor with RAM memory and other components illustrated for providing the necessary supervisory functions required.

Additional storage capability is provided to the system through a floppy controller/calendar circuit 40, which is connected to main processor 30 via bus 32. The floppy controller circuit 40 is in turn connected to a conventional floppy storage device 42 through bus 44.

Figure 2:
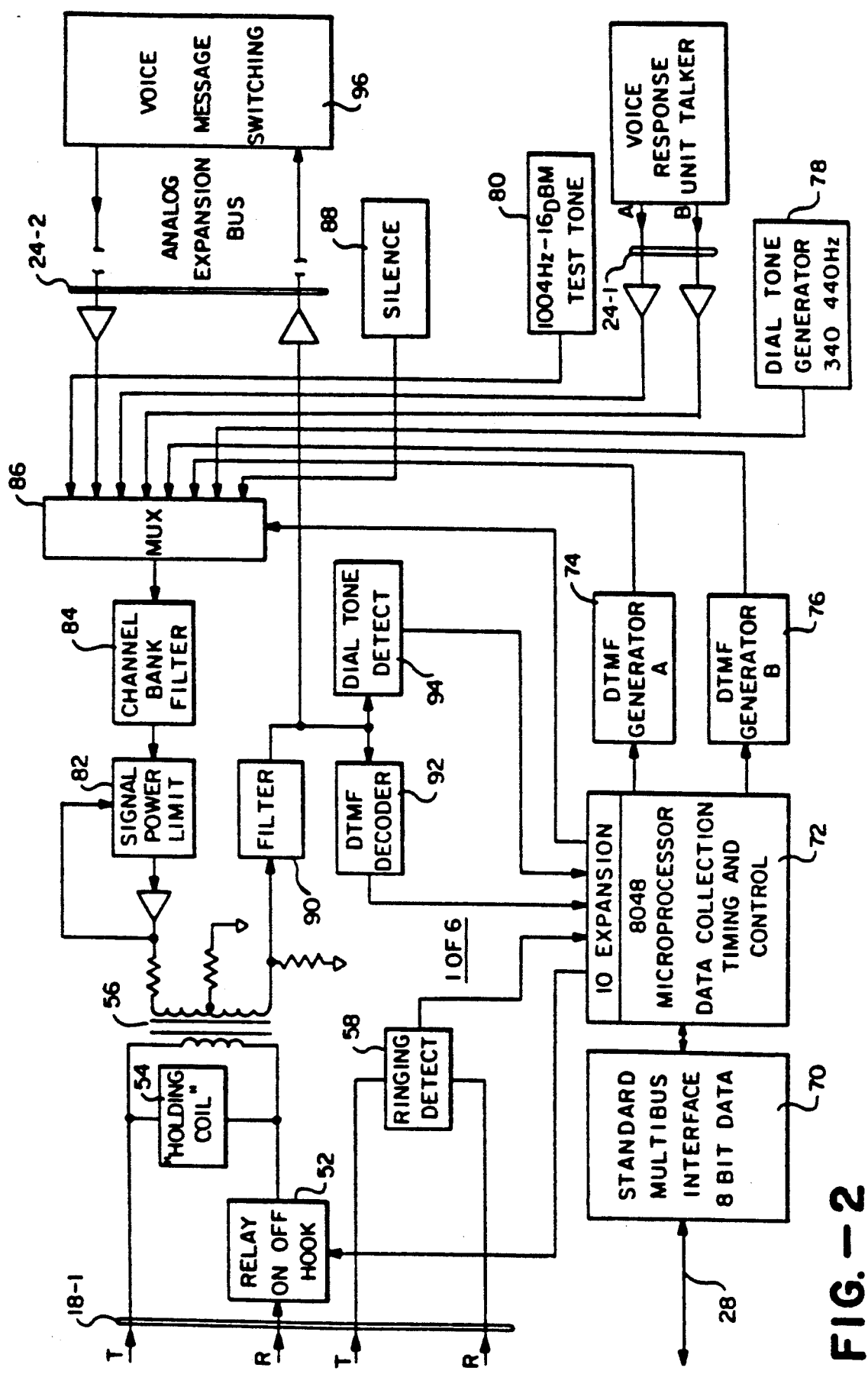
FIG. 2 depicts a diagram of a line interface unit, which forms a portion of FIG. 1.

Referring now to FIG. 2, a more detailed diagram of the line interface unit 20 of FIG. 1 is depicted.

In FIG. 2, line interface unit 20 is shown with only one of the six lines 18 (specifically line 18-1) which is connected to conventional subscriber lines (or tip-ring lines) 12 of FIG. 1.

In FIG. 2, the connections could be to two- or four-wire tip-ring pairs, as required by particular system necessities.

The relay off-hook circuit 52 is connected to the tip-ring pair 18 which, together with holding coil circuit 54 and transformer 56, provide the necessary coupling for "connecting" line interface unit 20 to the particular subscriber line.

Line interface unit 20 of FIG. 2 also includes a ring detect circuit 58, DTMF (dual tone multifrequency) decoder circuit 92 and dial tone detect circuit 94, all of which are connected to microprocessor 72, which is typically an 8048 microprocessor.

Microprocessor 72 in FIG. 2 is also connected to dual tone multifrequency generator circuits 74, 76, which are in turn connected to conventional multiplexer circuit 86.

Dial tone generator circuit 78 is also connected to multiplexer 86, together with test tone circuit 80 and silence circuit 88.

The output of line interface unit 20 via bus 24 is to talker circuit 22 with the output identified as bus 24-2 and the input bus identified as 24-1, as depicted in FIG. 2.

Multiplexer circuit 86 is controlled by microprocessor 72 and provides suitable multiplexing of desired signals through channel bank filter 84 and signal power limit circuit 82 for transformer coupling through transformer 56 to tip-ring pair 18.

In addition, microprocessor 72 is connected to a main processor via bus 28, via standard multibus interface 70, which is typically an 8-bit data bus.

Filter circuit 90 provides filtering for noise typically present in a subscriber environment. The signal power limit circuit 82 and channel bank filter 84 are also provided for required filtering of the system.

In order to illustrate in more detail one aspect of the present invention, a typical call sequence will be described in conjunction with the system depicted in FIGS. 1 and 2.

First assume an extension within the user environment desires to call another extension within the same complex via telephone subscriber lines 12.

Assume further that the second extension is a line connected to the present invention instead of another typical extension within the system.

The PBX 14 of FIG. 1 would then apply ring voltage to line interface unit 20. Ring detect circuit 58 of FIG. 2 would detect the ring voltage. Microprocessor 72 scans ring detect circuit 58, and after detecting the ring detect signal (for typically two samples), microprocessor 72 sends a code to main processor 30 of FIG. 1 telling processor 30 that the channel is being rung.

Main processor 30 sends a command to microprocessor 72 of FIG. 2 through bus 28 telling microprocessor 72 to activate off-hook relay 52.

Microprocessor 72, in response to this command, activates relay circuit 52 thereby answering the "call".

Main processor 30 sends a command to microprocessor 72, telling it to connect dial tone through generator circuit 78. Microprocessor 72 connects dial tone generator 78 to line 18-1.

The extension has now received the dial tone and now begins to "dial" the desired number. With a push-button type telephone subscriber set, dual tone multifrequency tones are generated, and DTMF decoder circuit 92 will detect valid digits. Microprocessor 72 reads this decoding and passes it to main processor 30. After the first digit, dial tone generator circuit 78 is connected and "silence" circuit 88 is connected to the subscriber line.

When main processor 30 determines it has enough digits to determine how to route the desired call, processor 30 sends an on-hook command to microprocessor 72, which in turn deactivates relay off-hook circuit 52. 400 milliseconds later, processor 30 tells microprocessor 72 to go back off-hook, and microprocessor 72 activates the off-hook relay circuit 52 (which is in effect a "flash" signal). The "flash" signal provides a technique for communicating with the PBX equipment.

Main processor 30 sends a command to microprocessor 72 to wait for dial tone. Microprocessor 72 scans dial tone circuit 94 waiting for two samples of tone present.

When dial tone is detected by detector circuit 94, microprocessor 72 sends a code back to main processor 30 telling it that tone has in fact been detected.

Main processor 30 sends a command to microprocessor 72 to "outpulse" (turn DTMF tones on and off) a trunk access code.

Main processor 30 then sends a command to microprocessor 72 to wait for the dial tone from the trunk, and when microprocessor 72 detects dial tone it tells main processor 30 of this event.

Main processor 30 then tells microprocessor 72 to "outpulse" the rest of the digits.

After the last digit is outpulsed, main processor 30 tells microprocessor 72 to go on-hook, and microprocessor 72 then sets relay off-hook circuit 52 on-hook, thereby disconnecting line interface unit 20 from the call request loop. The caller's desired number is handled thereon by PBX circuit 14.

A preferred embodiment of the PBX telephone call control system has been shown and described. As will be clear to those skilled in the art, variations of the system would come within the scope of the accompanying claims.

For example, the call control system provides call routing requests from internal extensions to external trunks, and from external trunks to internal extensions. The system also would provide additional call routing access such as from external trunks to other external trunks, as well as internal extensions. An example of such an external/internal routing access is if the user of the system were located outside of the system and wanted an information update or access to an internal extension through, for example, an in-WATS trunk line, he would merely need to call in to the call control system for the necessary update or routing to the internal extension. As another example, a caller could call into the system in order to access an external WATS trunk line.

Other aspects of the improved call control system include voice recognition, voice prompting aspects as described above, and voice storing and forwarding.

The last mentioned aspect would store messages and, upon request, transmit those voice messages over a long distance trunk line, conveying the messages at cheaper rates. The voice storing and forwarding feature could be achieved as illustrated in FIG. 2 by the line interface unit interfacing with a voice message switching (VMS) circuit 96, which is connected to analog expansion bus 24-2.

The VMS capability provides voice-storing, playback and forwarding capabilities, such as in a situation where a person calls into the system, leaves a voice message for another person, and is optionally transferred to a requested internal extension or external trunk. The system can, of course, provide necessary transfers of stored voice messages to any other extension within the system, or to any external trunk, thereby providing playback of the voice messages to the caller.

The overall system described above provides an improved PBX telephone call control system which adds additional features to existing PBX equipment, yet looks like any other extension to the rest of the system, while providing the necessary control of telephone call routing requests.

It is therefore intended that the scope of the present invention shall be limited only by the accompanying claims and any logical equivalents thereof.

What is claimed is:

1. A method of completing plural incoming telephone calls concurrently to corresponding plural facilities of a telephone switching system using a corresponding plurality of station lines of the switching system, comprising the steps of:

receiving a plurality of requests for service arising respectively from the incoming telephone calls directed toward the telephone switching system;

transmitting an instructional message to the sources of the requests for service to transmit communication facilities identifying information;

receiving and temporarily storing communication facilities identifying information transmitted from said sources of requests in response to said instructional message;

requesting service of said telephone switching system using said station lines;

receiving dial tone on the station lines from the telephone switching system and preventing the dial tone from reaching each said source of request for service;

transmitting communication facilities identifying information resulting from said stored communication facilities identifying information on the station lines to the telephone switching system so that the telephone switching system can effect plural communication paths between respective communication facilities and the respective sources of the requests for service; and causing the respective sources of requests for service to be connected to respective communication paths to provide for communication to the selected communication facilities.

* * * * *